United States Patent [19]

Shimada

[11] Patent Number: 5,323,271

[45] Date of Patent: Jun. 21, 1994

[54] WATER- AND AIR-COOLED REFLECTION MIRROR

[75] Inventor: Mizuho Shimada, Kanagawa, Japan

[73] Assignee: Equestrian Co., Ltd., Tokyo, Japan

[21] Appl. No.: 980,873

[22] Filed: Nov. 24, 1992

[51] Int. Cl.$^5$ .......................... G02B 7/195; G02B 5/08
[52] U.S. Cl. ................................... 359/845; 126/599;
126/696; 362/373; 362/345; 362/346
[58] Field of Search ............... 359/845; 126/432, 435,
126/442, 443, 448, 599, 684, 696; 250/504 R;
362/373, 345, 346; 34/4

[56] References Cited

U.S. PATENT DOCUMENTS

| | | | |
|---|---|---|---|
| 3,628,601 | 12/1971 | Snaper et al. | 362/345 |
| 3,966,308 | 6/1976 | Nilson | 359/845 |
| 4,005,135 | 1/1977 | Helding | 34/4 |
| 4,007,729 | 2/1977 | Chao et al. | 126/684 |
| 4,288,678 | 9/1981 | La Rocca | 359/845 |
| 4,708,124 | 11/1987 | Dorbeck | 126/684 |
| 4,798,960 | 1/1989 | Keller et al. | 34/4 |
| 5,094,010 | 3/1992 | Jacobs et al. | 34/4 |
| 5,150,253 | 9/1992 | Watanuki | 359/845 |

FOREIGN PATENT DOCUMENTS 0059843 4/1983 Japan .................... 359/845

*Primary Examiner*—Loha Ben
*Assistant Examiner*—Thomas Robbins
*Attorney, Agent, or Firm*—Lowe, Price, LeBlanc & Becker

[57] ABSTRACT

The water- and air-cooled reflection mirror of this invention, which can be applied to light projector, sterilizing lamp and development device, cools with water and air the reflection mirror that is heated by intense heat of the light source. The water flowing into the water passages formed in the reflection, mirror base body cools the base body to cool the air present in the opening in the base body, thereby preventing overheating of the reflection mirror by the circulating water and cooling air.

1 Claim, 3 Drawing Sheets

WATER- AND AIR-COOLED REFLECTION MIRROR

BACKGROUND OF THE INVENTION

1. Field of the Invention

The present invention relates to a water- and air-cooled reflection mirror incorporated in such equipment as a light projector, sterilizing lamp, and developing device, and more particularly to a water- and air-cooled reflection mirror which cools with water and air the reflection mirror that is heated by a light source.

2. Description of the Prior Art

Conventional reflection mirrors of this kind have different illumination intensities according to the use of the apparatuses and the objects being illuminated. When the illumination intensity required is relatively weak, the light source uses a low kilowatt bulb. Where an intense illumination is required as in a development device for printing, a bulb of 500 kW or 800 kW may be used. Such a high kilowatt bulb produces a large amount of heat, so that some provisions are made to protect the illumination devices from intense heat and to keep the temperature in the case or cubicle low. The most common measure is to use a fan to exhaust the hot air from the case.

As mentioned above, the reflection mirror using the high kilowatt bulb has the drawbacks of causing cracks and discoloration to the film formed on the surface of the reflection mirror, deteriorating the illumination function. Another drawback is that the reflected heat may deform the objects being illuminated or cause food to rot. Thus, even with the use of fans, it is not possible to remove heat sufficiently by discharging the heated air from the case. The use of fan therefore is not only unsuitable for the illumination equipment that uses a high kilowatt bulb but has a drawback of increasing the size of the illumination equipment as a whole.

SUMMARY OF THE INVENTION

It is therefore an object of this invention to provide a water- and air-cooled reflection mirror which, even when a high kilowatt bulb that produces intense heat is used, can keep the interior temperature in the apparatus low at all times by means of a simple construction.

To achieve the above objective, the water- and air-cooled reflection mirror of this invention comprises: a water- and air-cooled reflection mirror comprising reflection mirror base means having a concave inner wall surface formed therewithin, the reflection mirror base means having a light reflection layer formed on the concave inner wall surface to form a concave mirror; water passages formed in the reflection mirror base means through which water flows; and ducts formed in the reflection mirror base means through which air flows.

BRIEF DESCRIPTION OF THE DRAWINGS

The drawings show one embodiment of the mirror base body in the water- and air-cool reflection mirror according to this invention.

DETAILED DESCRIPTION OF PREFERRED EMBODIMENT

Figure 1:
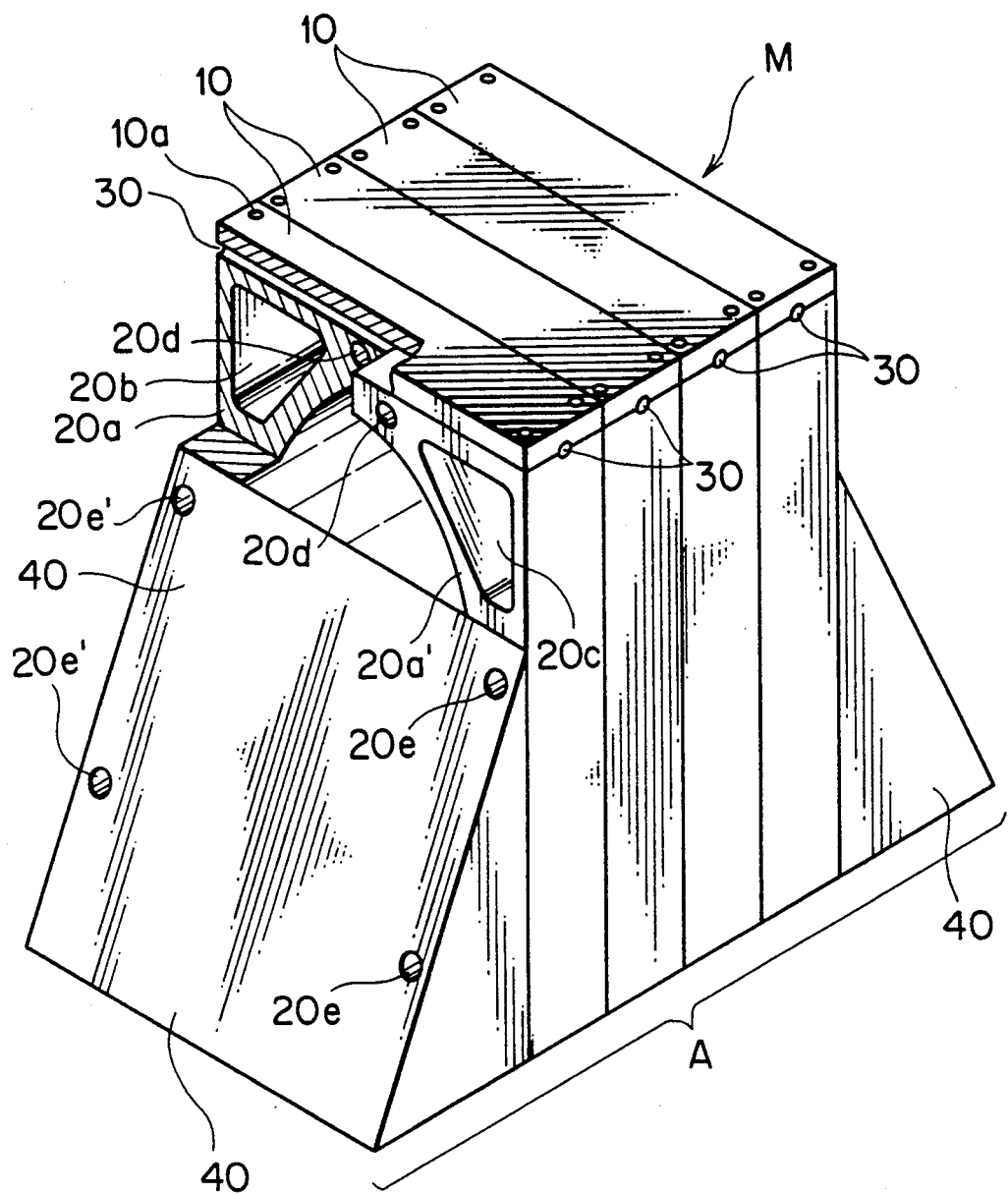
FIG. 1 is a perspective view of a partly cutaway reflection mirror base body in the invention.
Figure 2:
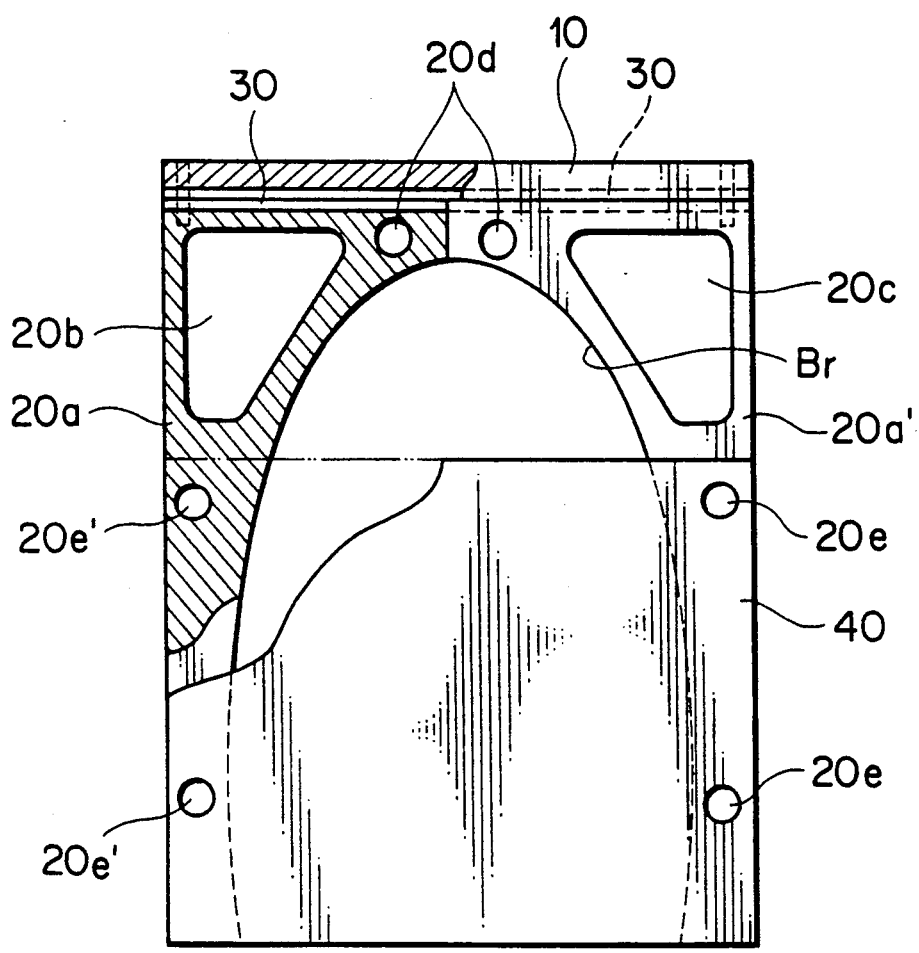
FIG. 2 is a front view of a partly cutaway reflection mirror base body in the invention.
Figure 3:
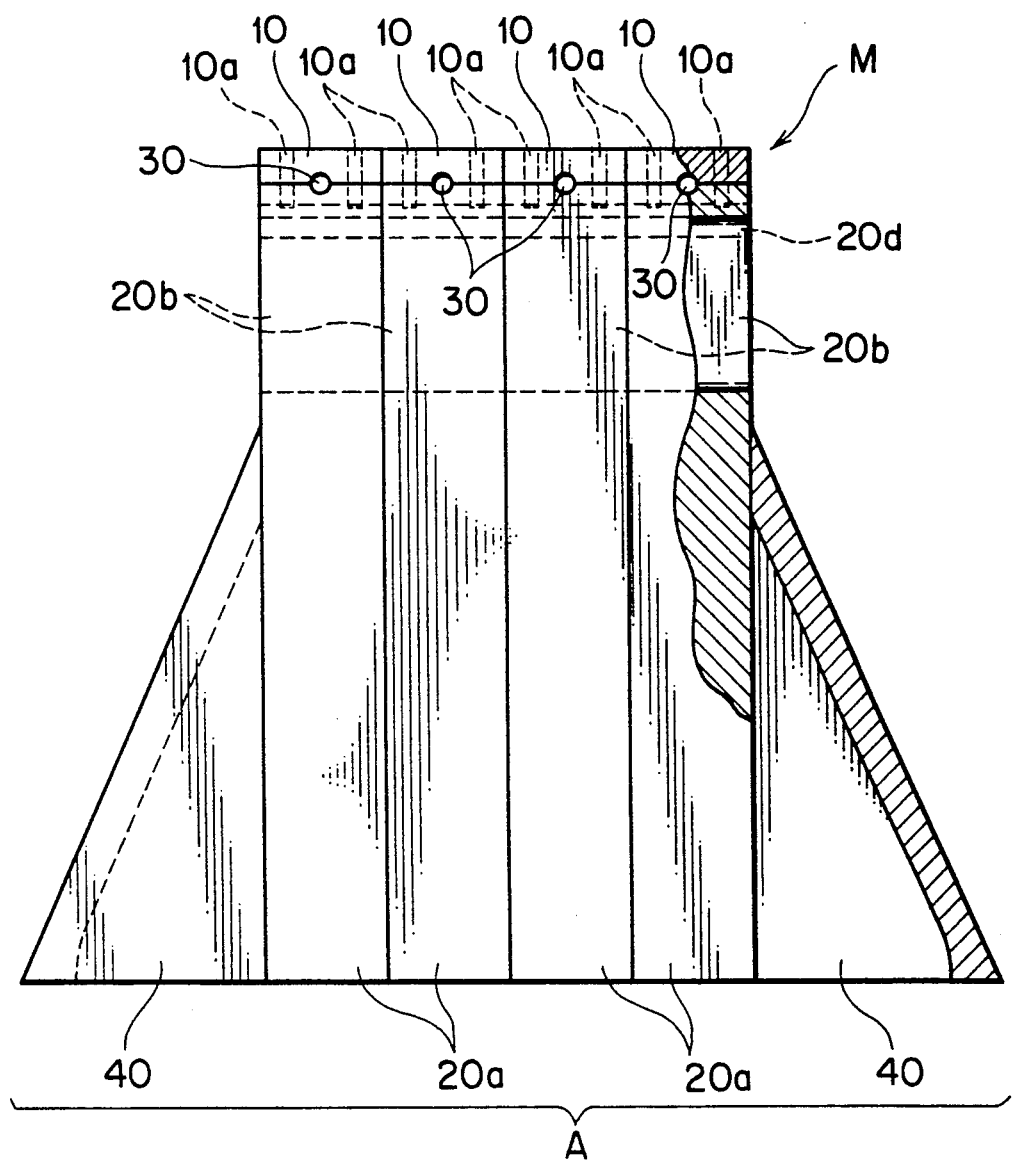
FIG. 3 is a left side view of FIG. 2.

Now, by referring to the accompanying drawings one embodiment of the water- and air-cooled reflection mirror according to this invention is described in detail. The drawings show one embodiment of the reflection mirror base body A in the water- and air-cooled reflection mirror M of this invention. FIG. 1 is a perspective view of a partly cutaway reflection mirror base body A in this invention, FIG. 2 is a front view of a partly cutaway reflection mirror base body A in this invention, and FIG. 3 is a left side view of FIG. 2. The reflection mirror base body of FIG. 1 is shown to be composed of a plurality of reflection mirror base bodies.

In the embodiment of the water- and air-cooled reflection mirror M of this invention, the reflection mirror base body A has a concave inner wall surface. The concave inner wall surface of the reflection mirror base body A is formed with a light reflection layer Br. The reflection mirror base body A has water passages 30 formed in the side wall through which water flows and ducts 20b, 20c formed therein through which air flows. The water flowing into the water passages 30 cools the reflection mirror base body A to cool the air flowing through the ducts 20b, 20c in the base body A. Hence, the circulating water and the cooling air keep the temperatures of the reflection mirror and its ambient air low. The circulating water is supplied through piping (not shown) connected to the water passages 30.

In the water- and air-cooled reflection mirror M of this invention, to improve the machining accuracy a plurality of support bases 10 are used and a pair of main reflection mirror bases 20a, 20a, are assembled together in opposing relation to each other. Plural pairs of such reflection mirror bases 20a, 20a, are further assembled together in tandem to form the reflection mirror base body A with the water passages 30. This is described in more detail, the support bases 10 of the base body A are formed with threaded holes 10a piercing therethrough. The underside of the support base 10 is engaged with the upper surface of the pair of primary reflection mirror bases 20a, 20a' with the concave wall surfaces of each pair of bases 20a, 20a' opposing each other. Screws (not shown) are screwed into the threaded holes 10a in the support base 10 to securely fasten the paired primary mirror bases 20a, 20a' to the support base 10.

While these reflection mirror elements are assembled in this manner, a water passage 30 is formed in the joint between the support base 10 and the paired main reflection mirror bases 20a, 20a', the water passage 30 being defined by semicircular grooves cut in the underside of the reflection mirror base 10 and in the upper surface of the paired bases 20a, 20a'. Piping for supplying water is connected to the water passage 30.

The paired main reflection mirror bases 20a, 20a' are formed with ducts 20b, 20c through which air flows, so that the air in the ducts is kept low in temperature by the cooled main reflection mirror bases 20a, 20a'. The ducts 20b, 20c may be formed as grooves cut in the outer surface of the paired main reflection mirror bases 20a, 20a' and the air in the grooves can still be cooled to a certain extent.

Since the paired main reflection mirror bases 20a, 20a' are formed with threaded holes 20d, 20d' at the same positions as those in other paired main reflection mirror bases, inserting long screws (not shown) into these threaded holes 20d, 20d' allows many main reflection mirror bases 20a, 20a' to be aligned and combined to form a block of mirror bases. This means that it is possible to form a mirror of a desired size. Further, since auxiliary reflection mirror bases 40 are formed with threaded holes 20e, 20e' at the same positions as those in the main reflection mirror bases 20a and other auxiliary reflection mirror bases 40, it is possible to attach two or more auxiliary reflection mirror bases 40 at both sides of the bases 20a, 20a' by screwing long screws (not shown) into these threaded holes 20e, 20e'.

The concave inner walls (not shown) of these auxiliary reflection mirror bases 40 are formed curved. Said auxiliary reflection mirror bases 40 are attached to both sides of the assembled reflection mirror bases 20a such that said curved inner walls of the auxiliary reflection mirror bases 40 complete a concave mirror of the reflection mirror on both sides thereof. The above-mentioned reflection mirror bases 10, 20a, 20a', 40 may be formed of metal, glass or resin, or a combination of these. The selection of material should consider various properties of the candidate material, such as heat resistance, ultraviolet resistance, resistance against discoloration, deformation and rusting, wear resistance, hardness, softness, machinability, and weight. Of the metal materials, brass and aluminum or aluminum alloy are used for the base of the reflection mirror. Although brass is heavier than aluminum, brass may be used instead of light aluminum material since the base can be made lighter by cutting many ducts 20b, 20c as described earlier and brass has good machinability and good anti-peeling property for plating.

The light reflection layer Br on the concave inner wall surface consists of a nickel plating to smooth out small rough areas remaining on the inner wall surface and a glossy plating of chrome, gold or silver over the nickel plating. For example, the chrome used as the glossy finish plating will prevent formation of pin holes or cracks. Small rough areas that remain on the inner wall surfaces of the reflection mirror base body A can be smoothed out by the nickel plating, thus simplifying the laborious process of buffing.

The glossy plated layer is vaporized with a heat ray absorbing layer that absorbs ultraviolet rays, visible rays and heat rays such as infrared rays. The heat ray absorbing layer Br is preferably a black heat ray absorbing layer, which, by interrupting the heat ray, protects the nickel plated layer and the chrome plated layer as well as the object being illuminated from deteriorating. The heat ray absorbing layer Br may be evaporated with a reflection heat ray transmission layer as a reflection layer G which passes the heat rays.

What is claimed is:

1. A water- and air-cooled reflection mirror comprising:
    an assembly of mirror bases which includes a plurality of main reflection mirror bases having respective concave wall surfaces, said concave wall surfaces of said main reflection mirror bases forming a concave recess when assembled together, said concave recess being open at opposed sides of said assembly of mirror bases;
    at least one auxiliary reflection mirror base attached on each of said opposed sides of said assembly of mirror bases, each of said at least one auxiliary mirror bases having a concave inner surface which is integral to lower portions of said concave recess of said assembly of mirror bases;
    water passages formed in said assembly of mirror bases for receiving a flow of water therethrough; and
    ducts formed in said assembly of mirror bases for receiving a flow of air therethrough.

* * * * *